(12) United States Patent
Bandic et al.

(10) Patent No.: US 8,909,859 B2
(45) Date of Patent: Dec. 9, 2014

(54) IMPLEMENTING LARGE BLOCK RANDOM WRITE HOT SPARE SSD FOR SMR RAID

(75) Inventors: Zvonimir Z. Bandic, San Jose, CA (US); Cyril Guyot, San Jose, CA (US); Tomohiro Harayama, Sunnyvale, CA (US); Hitoshi Kamei, Kanagawa (JP); Takaki Nakamura, Kanagawa (JP); Timothy Tsai, Alviso, CA (US)

(73) Assignee: HGST Netherlands B.V., Amsterdam (NL)

( * ) Notice: Subject to any disclaimer, the term of this patent is extended or adjusted under 35 U.S.C. 154(b) by 159 days.

(21) Appl. No.: 13/410,089

(22) Filed: Mar. 1, 2012

(65) Prior Publication Data

US 2013/0232292 A1 Sep. 5, 2013

(51) Int. Cl.
*G06F 12/00* (2006.01)
*G06F 12/02* (2006.01)
*G06F 3/06* (2006.01)

(52) U.S. Cl.
CPC .......... *G06F 12/0246* (2013.01); *G06F 3/0689* (2013.01); *G06F 3/0619* (2013.01); *G06F 3/0611* (2013.01)
USPC ........... 711/114; 711/103; 711/154; 711/170; 711/171; 714/4.12; 714/6.22

(58) Field of Classification Search
None
See application file for complete search history.

(56) References Cited

U.S. PATENT DOCUMENTS

| | | | |
|---|---|---|---|
| 2005/0071537 A1* | 3/2005 | New et al. | 711/100 |
| 2009/0327603 A1* | 12/2009 | McKean et al. | 711/114 |
| 2010/0079885 A1 | 4/2010 | McKean | |
| 2011/0029741 A1* | 2/2011 | Kuo | 711/154 |
| 2013/0185264 A1* | 7/2013 | Cohen et al. | 707/656 |

OTHER PUBLICATIONS

LSI™ MegaRAID® CacheCade™ Software, Add one or more SSDs and substantially improve IOPs performance rather than adding more drives to an array, LSI Corporation, Apr. 2010.

* cited by examiner

*Primary Examiner* — Aimee Li
*Assistant Examiner* — Alan Otto
(74) *Attorney, Agent, or Firm* — Joan Pennington

(57) ABSTRACT

A method and a storage system are provided for implementing a sustained large block random write performance mechanism for shingled magnetic recording (SMR) drives in a redundant array of inexpensive disks (RAID). A Solid State Drive (SSD) is provided with the SMR drives in the RAID. The SSD is used in a hot spare mode, which is activated when a large block random-write event is identified for a SMR drive in the RAID. In the hot spare mode, the SSD temporarily receives new incoming writes for the identified SMR drive. Then the identified SMR drive is updated from the SSD to restore the state of the identified SMR drive, and operations continue with normal writing only using the SMR drives in the RAID.

20 Claims, 10 Drawing Sheets

IMPLEMENTING LARGE BLOCK RANDOM WRITE HOT SPARE SSD FOR SMR RAID

FIELD OF THE INVENTION

The present invention relates generally to the data storage field, and more particularly, relates to a method and a storage system for implementing a large block random write hot spare Solid State Drive (SSD) for shingled magnetic recording (SMR) disk drives in a redundant array of inexpensive disks (RAID).

DESCRIPTION OF THE RELATED ART

Many data processing applications require long-term data storage and typically a high-degree of data integrity. Typically these needs are met by non-volatile data storage devices. Non-volatile storage or persistent media can be provided by a variety of devices, most commonly, by direct access storage devices (DASDs), which also are referred to as hard disk drives (HDDs), and advantageously includes Shingled Disk Drives (SDDs).

A Shingled Disk Drive (SDD) is a hard disk drive recording magnetic patterns of data on a writable disk surface in overlapping circular tracks using shingled magnetic recording (SMR) to achieve higher track density than conventional perpendicular magnetic recording (PMR). The SMR drives can be for example, advantageously included within a redundant array of inexpensive disks (RAID) in order to form massive, high-capacity disk array and storage subsystems. However, since a SMR drive typically equips on-disk write cache whereby incoming write requests are temporally stored or buffered before such data are eventually destaged to the corresponding data tracks, it often tends to face performance degradation due to limitation of available on-disk cache space and write-back capability for large writes of high load. A load is a workload and is defined as data size of arrival tasks divided by data size of departed or completed tasks within a certain time period. In addition, SMR drives have the similar seek latency characteristic as that of PMR drives, performance degradation can also be observed under random writes requests of high load.

A need exists for an effective and efficient method and apparatus for implementing sustained large block random write performance mechanism for SMR drives in a redundant array of inexpensive disks (RAID).

SUMMARY OF EMBODIMENTS OF THE INVENTION

Aspects of the present invention are to provide a method and a storage system for implementing a large block random write performance mechanism of SMR drives in a RAID configuration with hot spare SSDs. Other important aspects of the present invention are to provide such method and storage system substantially without negative effect and to overcome some of the disadvantages of prior art arrangements.

In brief, a method and a storage system are provided for implementing a large block random write performance mechanism of SMR drives in a RAID configuration with hot spare SSDs. A Solid State Drive (SSD) is provided with the SMR drives in the RAID as SSDs commonly have fault and performance characteristics different from those of SMR drives. The SSD or other faster, non-volatile storage media is used in a hot spare mode, which is scheduled and activated when a large block random write event is identified for a particular SMR drive in the RAID. In the hot spare mode, the SSD temporarily receives new incoming writes for the identified, performance-degrading SMR drive responsive to the identified large block random write event of high load.

BRIEF DESCRIPTION OF THE DRAWINGS

The present invention together with the above and other objects and advantages may best be understood from the following detailed description of the embodiments of the invention illustrated in the drawings, wherein.

DETAILED DESCRIPTION OF THE EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the embodiments of the invention, methods and a storage system are provided for implementing a sustained large block random write performance mechanism for SMR drives in a redundant array of inexpensive disks (RAID). A SSD is used in a hot spare mode, which is activated when a large block random write event is identified for a SMR drive in the RAID. In the hot spare mode, the SSD temporarily receives new incoming writes for the identified SMR drive while the remaining SMR drives in RAID system perform the read and/or write operations. Then each identified SMR drive is updated from the SSD during a time of less utilization of a RAID array controller during a recovery mode.

Figure 1:
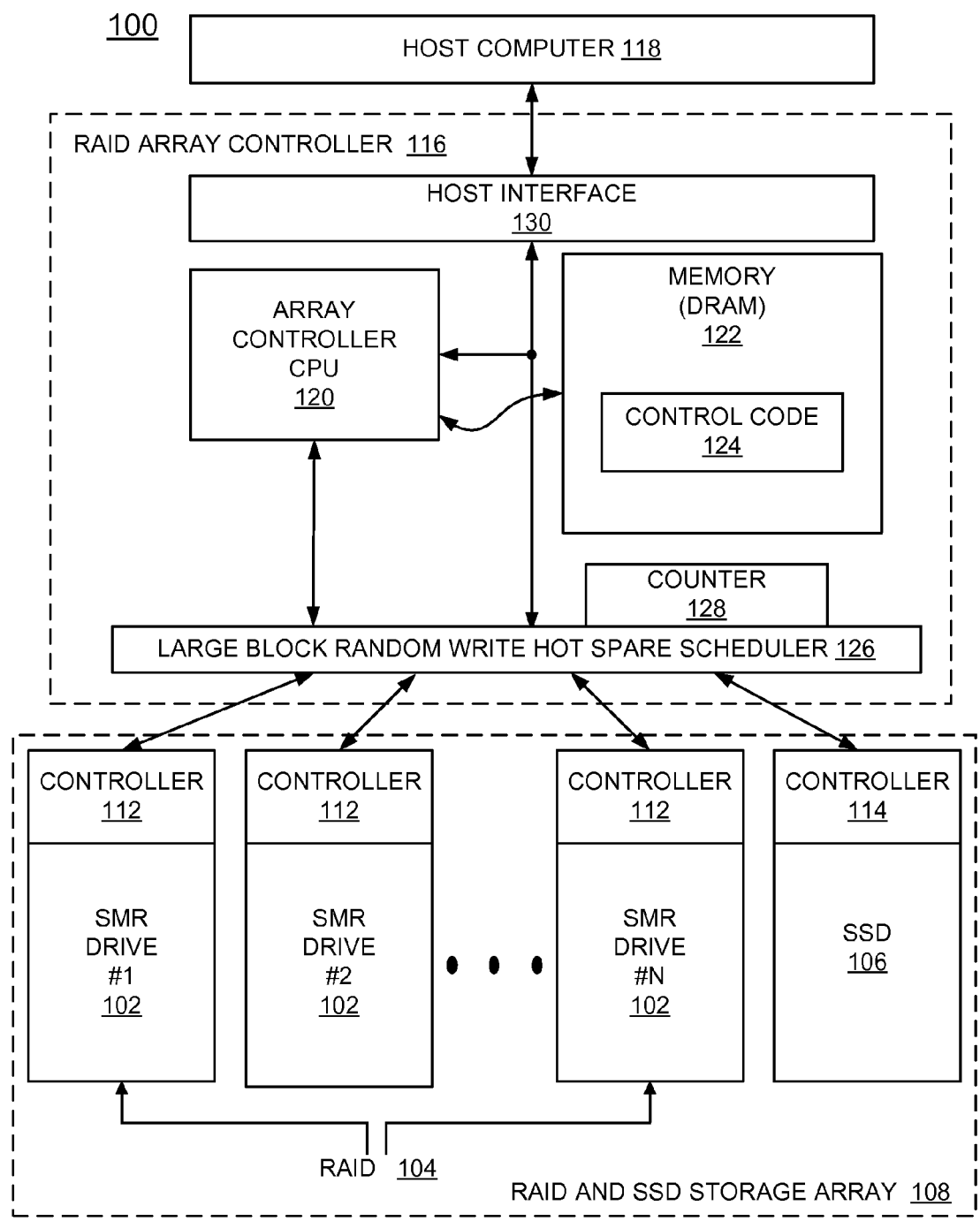
FIG. 1 is a block diagram representation of a storage system for implementing a sustained large block random write performance mechanism for SMR drives in a redundant array of inexpensive disks (RAID) in accordance with an embodiment of the invention.

Having reference now to the drawings, in FIG. 1, there is shown an example system generally designated by the reference character 100 for implementing a sustained large block random write performance mechanism for SMR drives 102 in a redundant array of inexpensive disks (RAID) 104 in accordance with an embodiment of the invention. The RAID 104 is provided with at least one Solid State Drive (SSD) 106 in an overall RAID and SSD storage array 108. Each SMD drive 102 includes an associated controller 112 and the SSD 106 includes an associated controller 114.

System 100 includes a RAID array controller 116 coupled between a host computer 104 and the RAID and SSD storage array 108. The RAID array controller 116 includes an array controller central processor unit (CPU) 120, a memory 122, such as a dynamic random access memory (DRAM); including a control code 124 in accordance with an embodiment of the invention. The RAID array controller 116 includes a large block random write hot spare scheduler 126 including a counter mechanism 128 for detecting and identifying non-sequential block address, for accounting of large blocks as well as utilization and load of incoming writes to participating SMR drives that determines when to proceed the hot spare of the SSD 106 in accordance with an embodiment of the invention. The array controller CPU 120 of RAID array controller 116 includes firmware that is given direct access to the large block random write hot spare scheduler 126.

It should be understood that principles of the present invention are not limited to the illustrated system 100 and RAID array controller 116. RAID array controller 116 and array controller CPU 120 can include various implementations, for example, fabricated with one or multiple integrated circuit dies. A digital video recorder (DVR), a set-top-box (STB), or various other computer system types are specific implementation of the host computer 118. For example, the control code 124 and the large block random write hot spare scheduler 126 with the counter 128 may reside in any suitable location, such as, in the host computer 118 and the like, instead of the RAID array controller 116. For example, the RAID and SSD storage array 108 may include a plurality of SSDs 106 provided together with RAID 104 for use in the hot spare mode of the SSD 106 in accordance with an embodiment of the invention.

System 100 is shown in simplified form sufficient for understanding the present invention. The illustrated host computer 118 together with RAID array controller 116 is not intended to imply architectural or functional limitations. The present invention can be used with various hardware implementations and systems and various other internal hardware devices. For example, the example embodiment of system 100 is described in the context of one SSD 106, it should be understood that principles of the present invention advantageously are applied to multiple SSDs 106.

In accordance with features of the embodiments of the invention, in the RAID and SSD storage array 108 providing RAID 104 together with the SSD 106 for use in the large block random write hot spare mode enables enhanced performance for the RAID. It should be understood that principles of the present invention advantageously are applied to various SMR drive RAID arrangements, for example, various numbers and capacity of SMR drives, with various stripe size, various workloads, and the like. It should be understood that principles of the present invention advantageously are applied to various SMR drive RAID levels, such as JBOD, RAID0, RAID1, RAID4, RAID5, RAID6, and the like.

Figure 2:
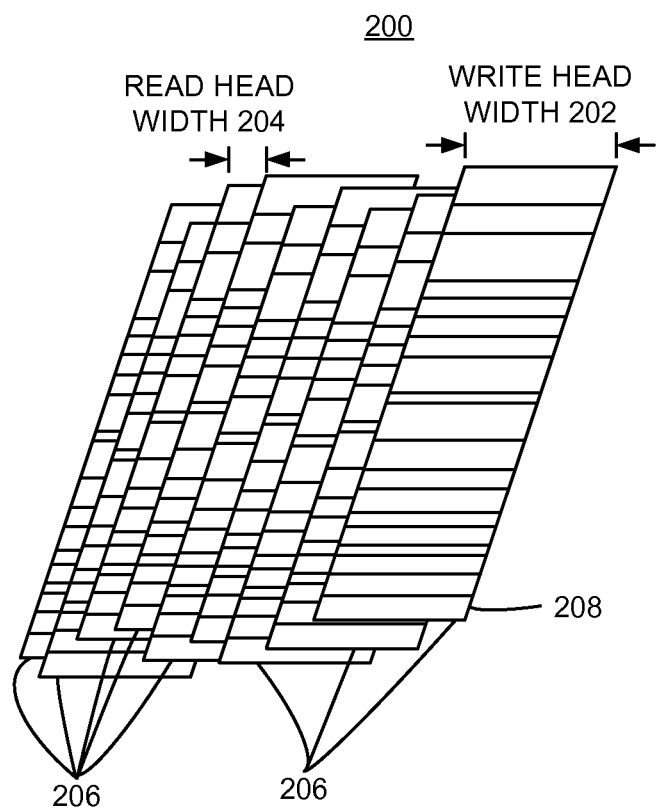
FIG. 2 schematically illustrates not to scale an example block of shingled writing in the SMR drives in the RAID of the system of FIG. 1 in accordance with an embodiment of the invention.

Referring to FIG. 2, an example block 200 of shingled writing in a storage device, or SMR drive 102 of the RAID 104 is schematically illustrated not to scale in accordance with an embodiment of the invention. The SMR drive 102 of the RAID 104 advantageously is arranged to achieve high track density using shingled magnetic recording (SMR) in accordance with an embodiment of the invention.

As shown in FIG. 2, a write head width 202 is much wider, for example, approximately three times wider, than the width of final data tracks, and the read head width 204 is sufficiently narrow so as to read back data from only one trimmed track at a time. The data block 200 includes a plurality of overlapping data tracks 206. Each of the tracks 206 contains several sectors. Each sector contains several bytes of data. An example of a sector 208 is shown. The data block 200 includes a plurality of or a set of overlapping sectors 208, such as one or more sectors in length.

Figure 3:
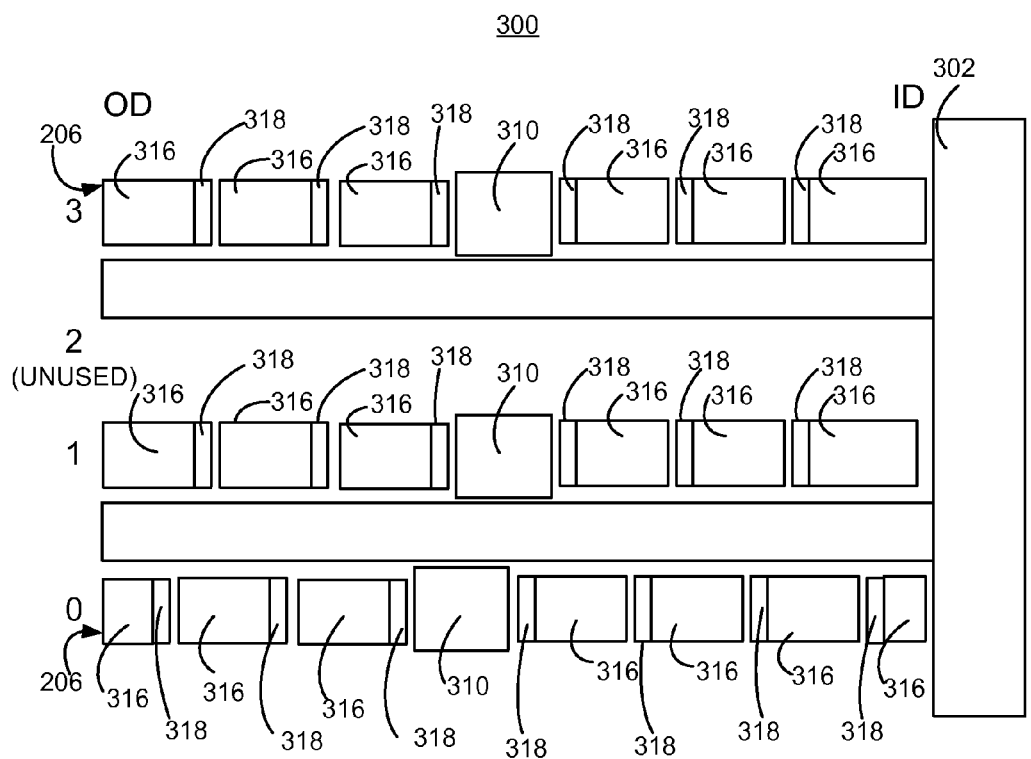
FIG. 3 schematically illustrates I-track regions, Write twice cache, and Exception Regions (E-Regions) in an example Shingled Disk Drive geometry with shingled magnetic recording (SMR) in accordance with an embodiment of the invention.

Referring to FIG. 3, an illustrated example Shingled Disk Drive (SDD) geometry 300 with shingled magnetic recording (SMR) includes a spindle 302 proximate to an inner diameter (ID) of a disk including a plurality of tracks 206, #0-3. A plurality of one or more respective Exception Regions (E-Regions) 310 is disposed between the ID and an outer diameter (OD) of the plurality of tracks 206. A plurality of I-track regions 316 together with a Write-Twice Cache 318 and the Exception Region (E-Region) 310 are disposed between the ID and an outer diameter (OD) of the illustrated prior art SDD geometry.

In the SMR drives 102 of RAID 104 in accordance with features of the embodiments of the invention, large-block-random write problems of conventional SMR drives are effectively overcome. In the conventional SMR drives, one SMR drive can receive many write requests from a host and or storage subsystem, and consequently an E-region, such as E-region 310, is rapidly populated by cached writes. Cached writes in the E-Region in a conventional SMR drive then are destaged from the E-Region 310 to I-Region 316 with a traditional, prior art SMR algorithm.

The conventional SMR drives suffer from a long write performance penalty because all cached writes in the E-Region 310 must be eventually destaged to I-Region 316, which is the permanent location. One SMR SDD often performs destage operations more frequently, for example, as compared against other drives in the system. In the RAID, it is conventional wisdom to use all identical drives to achieve synchronization of rotational, seek and other disk properties. However, such long write problems incurred by destage of caches writes from the E-Region 310 to I-Region 316 will cause the lack of synchronization to the RAID configuration, which is a problem for SMR disk array performance.

In accordance with features of the embodiments of the invention, a large block random write event for a SMR drive 102 in the RAID 104 is identified. The SSD 106 is used in a hot spare mode, which is activated when a large block random write event is identified for a SMR drive 102 in the RAID 104, for example, as illustrated and described with respect to FIG. 4.

Figure 4:
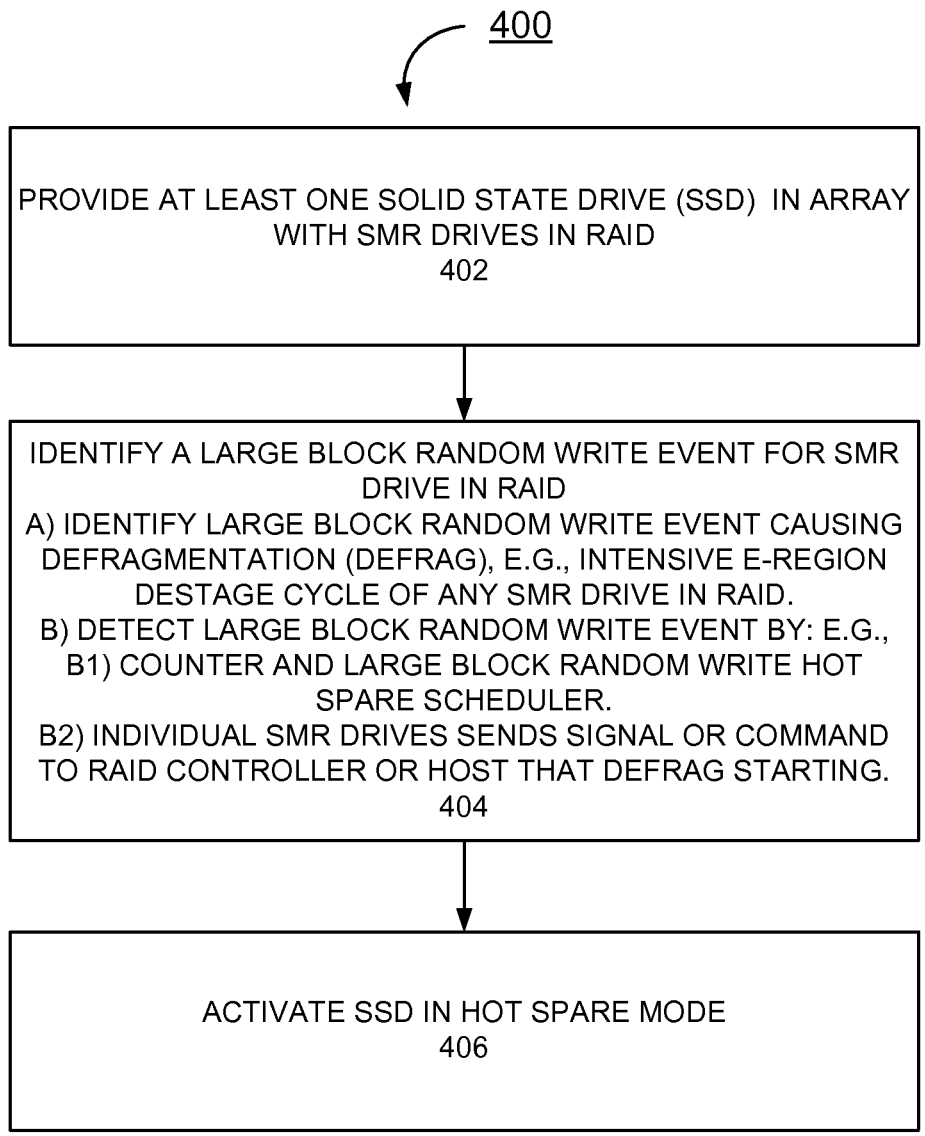
FIGS. 4, 5, and 6 are flow charts illustrating example operations of the system of FIG. 1 for implementing a sustained large block random write performance mechanism for SMR drives in a redundant array of inexpensive disks (RAID) using a Solid State Drive (SSD) in accordance with embodiments of the invention.

Referring to FIG. 4, there are shown example operations generally designated by the reference character 400 of the system 100 for implementing a sustained large block random write performance mechanism for SMR drives 102 in RAID 104 with SSD 106 in the RAID and SSD storage array 108. As indicated at a block 402, at least one solid state drive (SSD) is provided in an array with SMR drives in RAID. A large block random write event for a SMR drives 102 in the RAID 104 is identified as indicated at a block 404. For example, as shown at block 404, A) a large block random write event causing defragmentation (defrag) activity inside a SMR drive is identified, such as, an intensive E-region destage cycle of any SMR drive 102 in the RAID 104. For example, as shown at block 404, B) a large block random write event is detected by B1) a counter 128 and large block random write hot spare scheduler 126 in system 100. For example, as shown at block 404, B2) the large block random write event is detected by individual SMR drives 102 sending a signal or command to the RAID controller 116 or host computer 118 that defrag is starting. As indicated at a block 406, the SSD 106 is activated in the hot spare mode.

Figure 5:
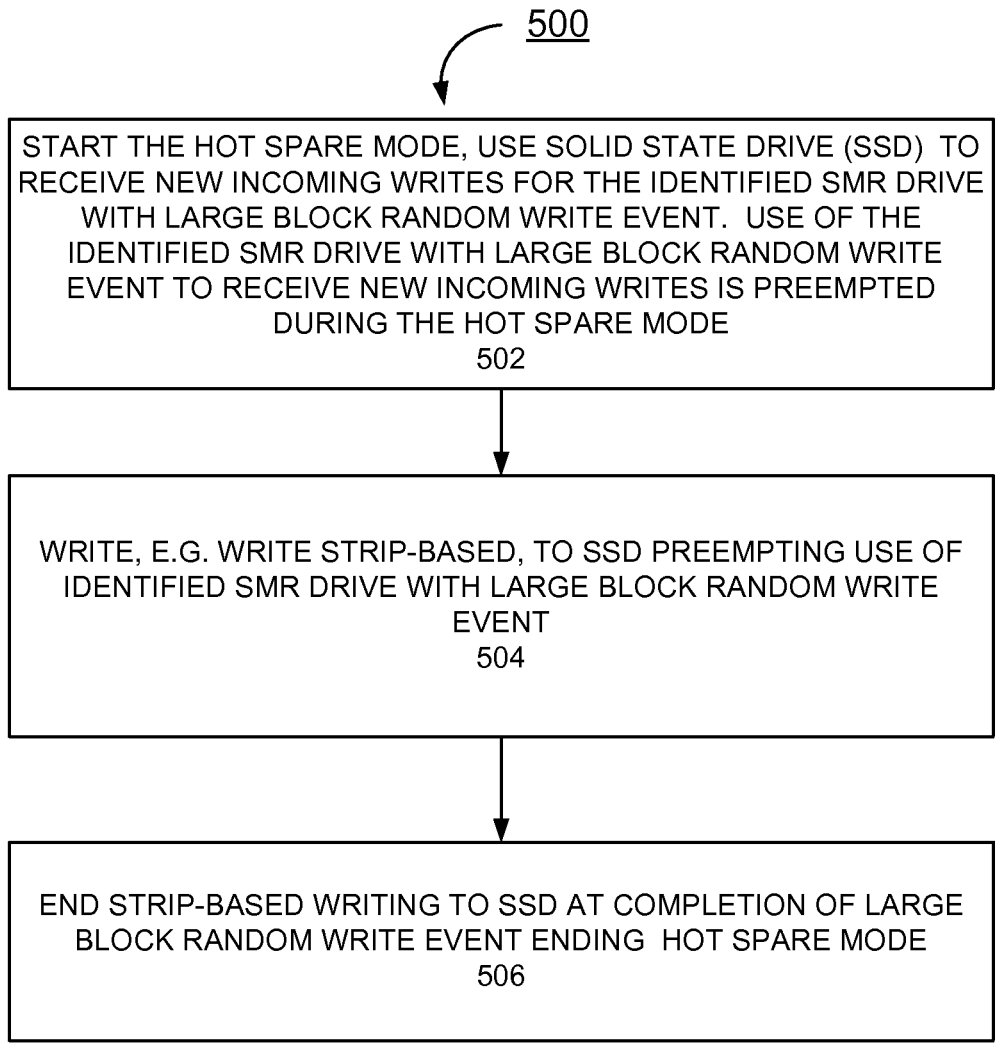

In accordance with features of the embodiments of the invention, in the hot spare mode, the SSD temporarily receives new incoming writes for the identified SMR drive while the SMR drive performs the large block random write event, for example, as illustrated and described with respect to FIG. 5.

Referring to FIG. 5, there are shown example operations generally designated by the reference character 500 of the system 100 for implementing a sustained large block random write performance mechanism for SMR drives 102 in RAID 104 with SSD 106 in the RAID and SSD storage array 108. As indicated at a block 502, the hot spare mode is started, and a SSD 106 is used to receive new incoming writes for the identified SMR drive 102 with the large block random write event. Use of the identified SMR drive 102 with the large block random write event is preempted as shown at block 502. Writing, for example, writing strip-based, to the SSD 106 is performed, preempting use of the identified SMR drive with large block random write event as indicated at a block 504. As indicated at a block 506, writing strip-based to the SSD 106 ends at the completion of the large block random write event ending the hot spare mode.

In accordance with features of the embodiments of the invention, the identified SMR drive with the large block random write event is updated from the SSD during a time of less utilization of a RAID array controller.

Figure 6:
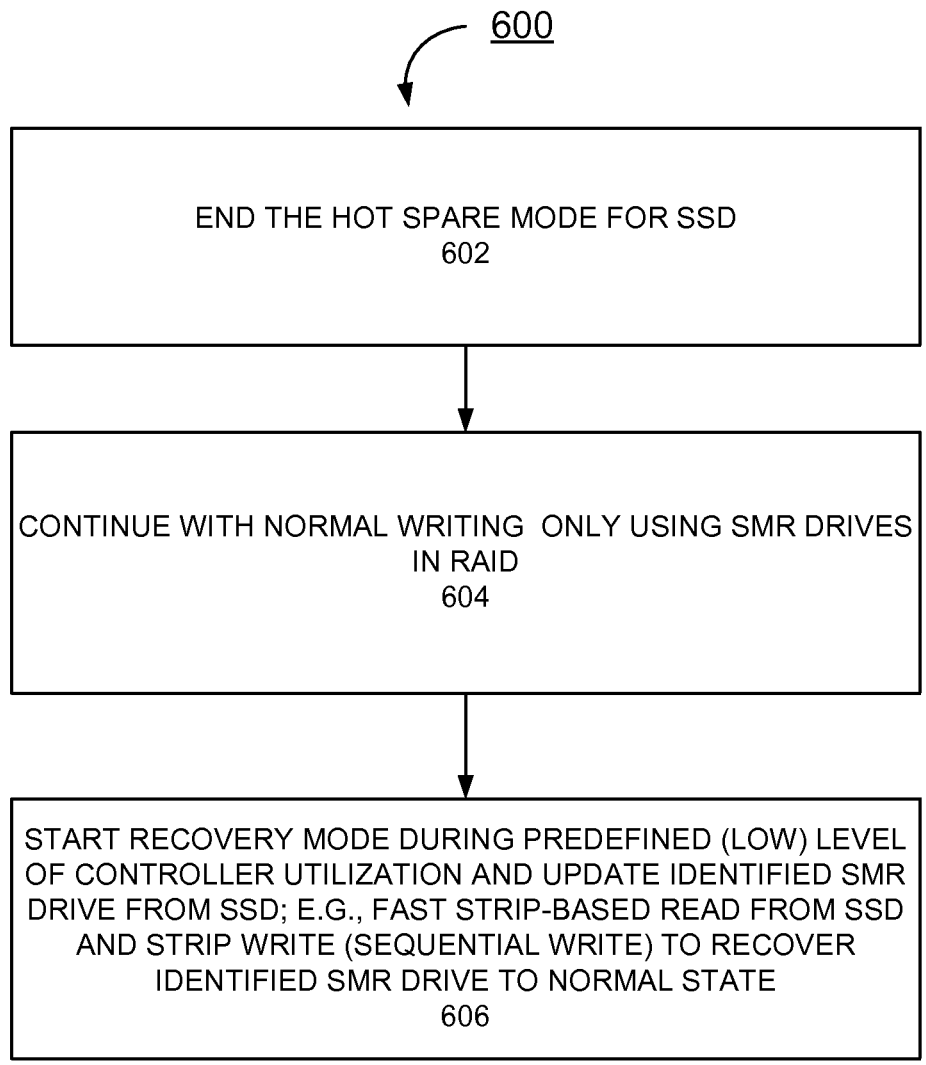

Referring to FIG. 6, there are shown example operations generally designated by the reference character 600 of the system 100 for implementing a sustained large block random write performance mechanism for SMR drives 102 in RAID 104 with SSD 106 in the RAID and SSD storage array 108. As indicated at a block 602, the hot spare mode for the SSD 106 ends. Operations continue with normal writing only using SMR SDDs in the RAID 104 as indicated at a block 604. A recovery mode is started during a time of less utilization of the RAID controller, and the identified SMR SSD is updated, and for example, a fast strip-based read from the SSD and strip write or sequential write is performed to recover the identified SMR SDD to the normal state following the hot spare mode, as indicated at a block 606.

Figure 7:
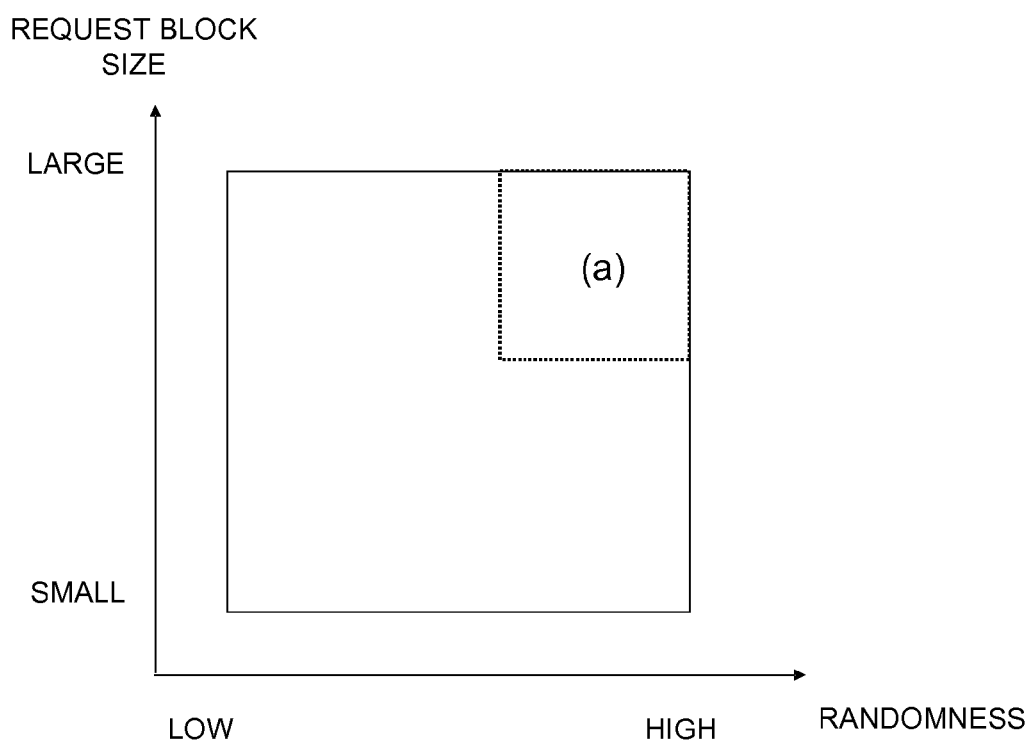
FIG. 7 schematically illustrates write request block characteristics including relatively large and random or low locality, which are the potential cause of performance degradation of SMR drives in accordance with embodiments of the invention.

Referring now to FIG. 7, two dimensional aspects of incoming I/O loads of writes are illustrated. The quadrant of high randomness and large block size are the areas where SMR drives experience performance degradation. In such writes requests of high load, the head of SMR drives must perform many seek operations due to the randomness of block addresses. In block (a) write request to SMR drives show relatively large and random or low spatial and temporal locality characteristics. Also as prescribed in FIG. 3, large block request will fill in on-disk cache of SMR drives quicker so that more destage operation is needed, incurring further performance degradation. It is well understood in the art of this kind, that non-sequential test or random test of request block address of similar test is used to detect and identify random I/O request. It is also known that RAID maintains windows or table forms of request block lengths counters as well as history of arrival and completion of write requests in order to implement a large block random write hot spare scheduler.

Figure 8:
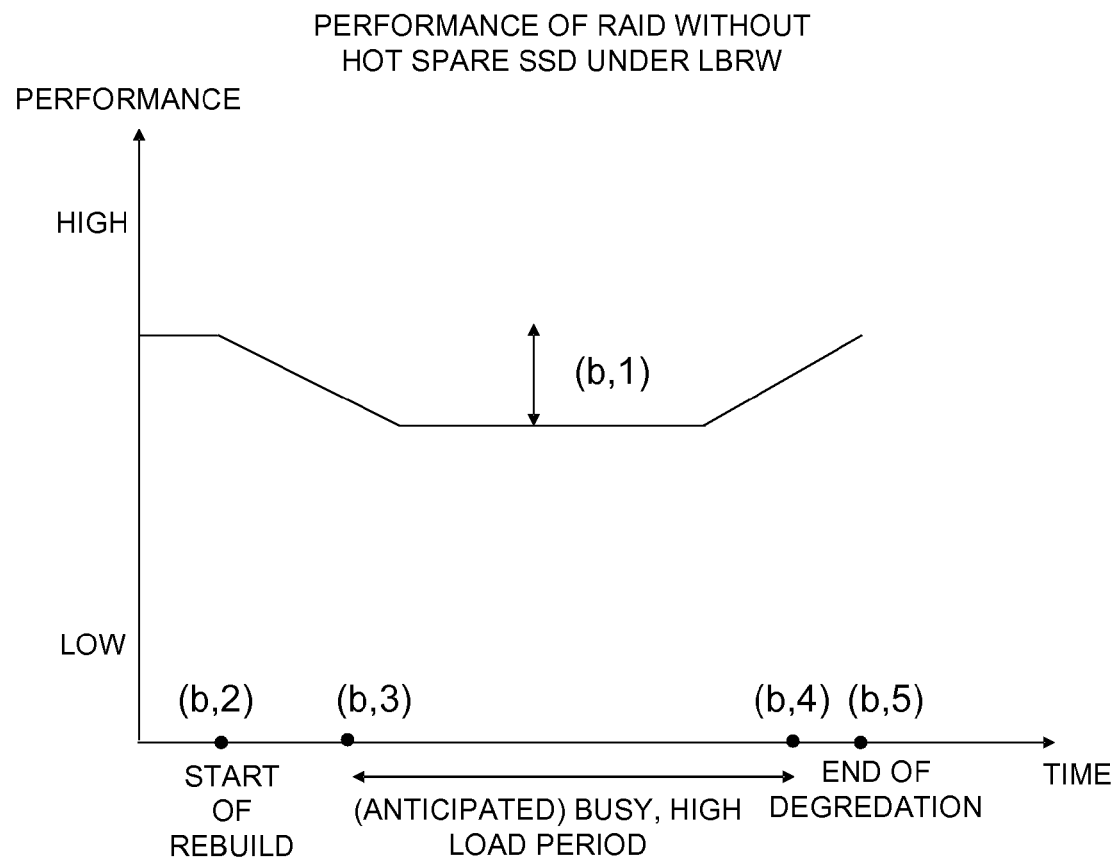
FIG. 8 schematically illustrates an example when SMR drives are operating under large block random write of high load, and shows that if busy, high load period overlaps with the period when SMR drive is facing performance degradation, or disk failure, overall performance could be jeopardized in accordance with embodiments of the invention.

Referring now to FIG. 8, the typical scenarios is depicted whereby anticipated high load, busy period overlaps with SMR drives performance degradation in RAID systems without hot spare mechanism. While busy, high load period are often predicted or scheduled on hourly or daily basis, the SMR RAID system with no hot spare cannot avoid performance degradation or failure due to high load of large block random writes. In FIG. 8, (b, 1) indicates performance degradation due to large block random write; (b, 2) indicates start of performance degradation; arrow between (b, 3)-(b, 4) indicates anticipated high load, busy period to the SMR drives; and (b, 5) indicates end of performance degradation.

Figure 9:
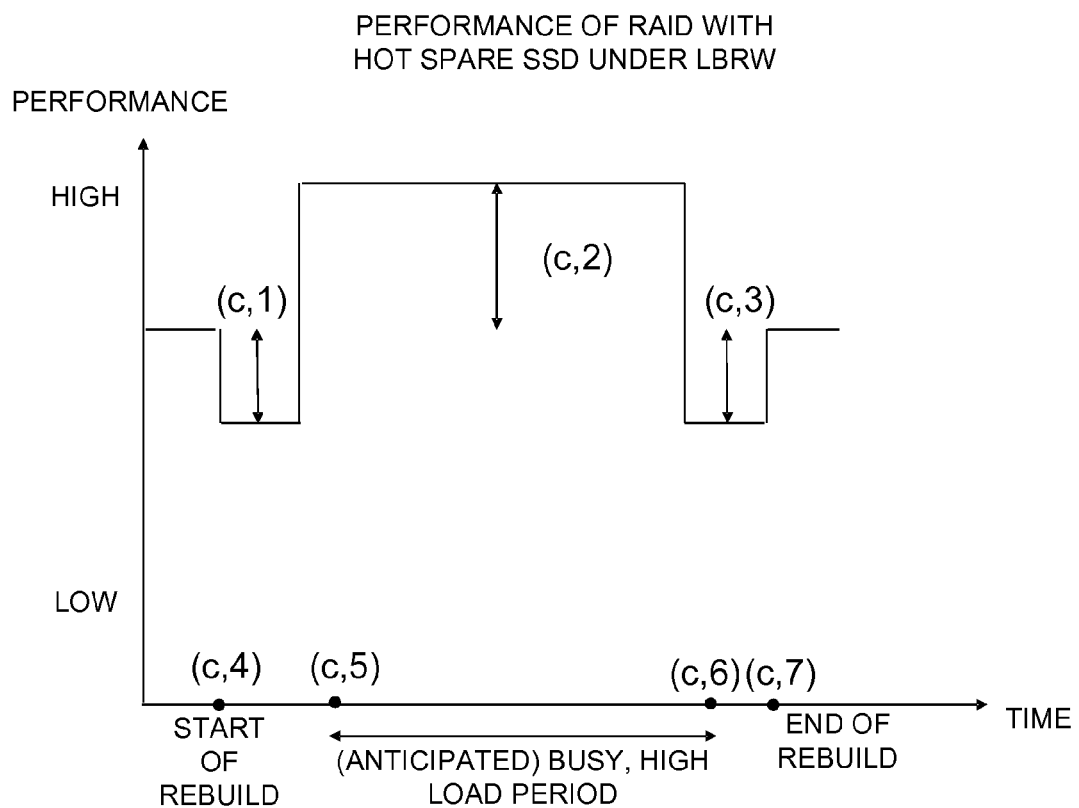
FIG. 9 schematically illustrates an example when SMR drives are operating under large block random write of high load with hot spare SSDs, and shows that busy, high load period overlaps with the period when SMR drive is expected to face performance degradation or disk failure, and upon detection of large-block random writes of high load, the large block random write (LBRW) scheduler initiates a hot spare mode of SSD, with the SSD having higher performance in general, the performance could improve after RAID rebuild is complete in accordance with embodiments of the invention.

Referring now to FIG. 9, the typical scenarios is depicted whereby anticipated high load, busy period overlaps with SMR drives performance degradation in RAID systems with hot spare mechanism. A large block random write scheduler as in FIG. 7 plans, schedule and activate hot spare SSD at the time subject SMR drive's performance could degrade due to large block random writes of high load in order to offset the rebuild performance degradation during anticipated busy time. Due to the fact that SSDs have different performance and reliability characteristics, it is possible to amortize overall performance under the prescribed workload. In FIG. 9, (c, 1) indicates performance degradation due to hot spare SSD rebuild; (c, 2) indicates performance improvement due to completion of hot spare SSD of RAID systems; (c, 3) indicates performance degradation due to restoration of SMR drive from hot spare SSD; (c, 4) indicates time at which LBRW scheduler initiates hot sparing of SMR drive to SSD; arrow between (c, 5)-(c, 6) indicates anticipated high load, busy period to the SMR drives; and (c, 7) indicates end of restoration of SMR drive to normal state.

Figure 10:
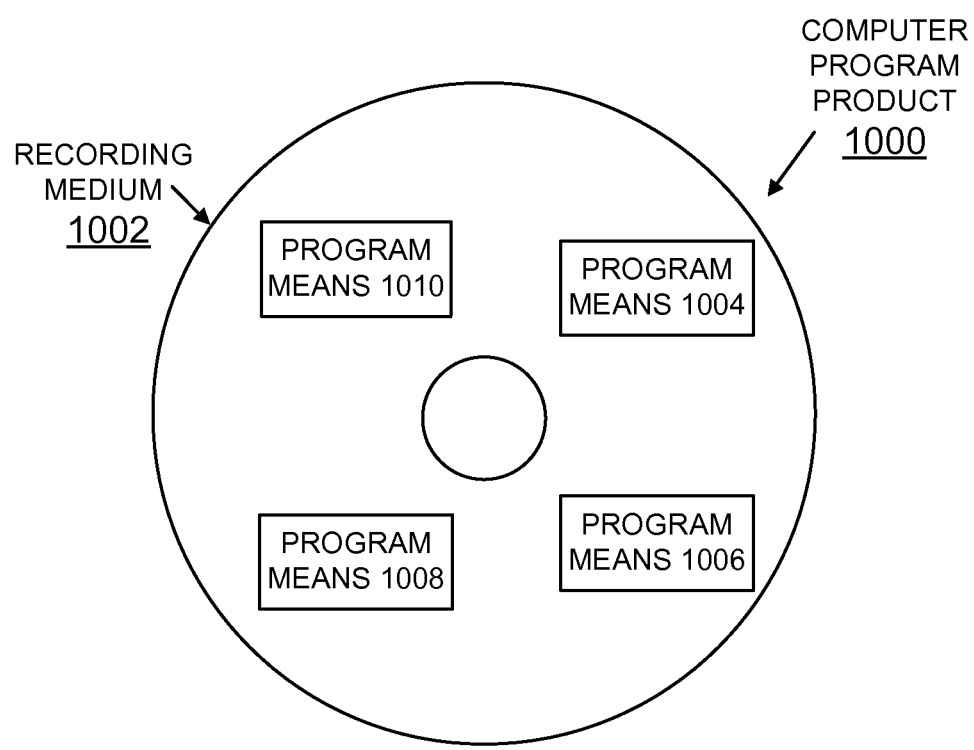
FIG. 10 is a block diagram illustrating a computer program product in accordance with embodiments of the invention.

Referring now to FIG. 10, an article of manufacture or a computer program product 1000 of the invention is illustrated. The computer program product 1000 includes a computer readable recording medium 1002, such as, a floppy disk, a high capacity read only memory in the form of an optically read compact disk or CD-ROM, a tape, or another similar computer program product. Computer readable recording medium 1002 stores program means or control code 1004, 1006, 1008, 1010 on the medium 1002 for carrying out the methods for implementing a sustained large block random write performance mechanism for SMR drives 102 in the redundant array of inexpensive disks (RAID) 104 with the Solid State Drive (SSD) 106 in accordance with embodiments of the invention in the system 100 of FIG. 1.

A sequence of program instructions or a logical assembly of one or more interrelated modules defined by the recorded program means or control code 1004, 1006, 1008, 1010, direct the system 100 for implementing use of the Solid State Drive (SSD) 106 with the SMR drives 102 in the RAID 104 and hot spare mode methods of the embodiments of the invention.

While the present invention has been described with reference to the details of the embodiments of the invention shown in the drawing, these details are not intended to limit the scope of the invention as claimed in the appended claims.

What is claimed is:

1. A method for implementing a sustained large block random write performance mechanism for multiple shingled magnetic recording (SMR) drives in a redundant array of inexpensive disks (RAID) comprising:
    providing a single Solid State Drive (SSD) with the multiple SMR drives in the RAID;
    using said SSD only in a hot spare mode with the multiple SMR drives,
    identifying a large block random write event for a SMR drive in the RAID;
    activating said SSD in said hot spare mode responsive to the identified large block random write event for the SMR drive;
    temporarily receiving new incoming writes for the identified SMR drive with said SSD preempting use of the identified SMR drive;
    ending the hot spare mode for said SSD and continuing with normal writing only using SMR drives in the RAID; and
    identifying a recovery mode for the identified SMR drive responsive to ending said hot spare mode, and moving data from said SSD to the identified SMR drive.

2. The method as recited in claim 1 wherein identifying a recovery mode responsive to ending said hot spare mode includes identifying a predefined level of controller utilization, and moving data from said SSD to the identified SMR drive to recover the identified SMR drive to a normal state.

3. The method as recited in claim 1 wherein identifying said large block random write event for a SMR drive in the RAID includes one of said SMR drives sending a signal to a RAID controller responsive to defragmentation being started.

4. The method as recited in claim 1 wherein identifying said large block random write event for a SMR drive in the RAID includes providing a counter and a large block random write hot spare scheduler for detecting said large block random write event for a SMR drive.

5. The method as recited in claim 1 wherein temporarily receiving new incoming writes for the identified SMR drive with said SSD includes writing new incoming writes to said SSD, preempting use of the identified SMR drive for the new incoming writes only during the hot spare mode for said SSD.

6. The method as recited in claim 1 wherein temporarily receiving new incoming writes for the identified SMR drive with said SSD includes writing strip-based to said SSD and preempting use of the identified SMR drive for the new incoming writes only during the hot spare mode for said SSD.

7. The method as recited in claim 1 wherein temporarily receiving new incoming writes for the identified SMR drive with said SSD includes ending strip-based writing to said SSD at completion of the large block random write event ending the hot spare mode.

8. The method as recited in claim 1 includes continuing with normal writing only using the SMR drives in the RAID responsive to completion of the large block random write event ending the hot spare mode.

9. The method as recited in claim 8 includes identifying a recovery mode, and performing a fast strip-based data read from said SSD to restore the identified SMR drive.

10. The method as recited in claim 9 wherein identifying said recovery mode includes identifying at least one of a predefined level of controller utilization and a predefined level of drive utilization, and starting said recovery mode.

11. An apparatus for implementing a sustained large block random write performance mechanism for multiple shingled magnetic recording (SMR) drives in a redundant array of inexpensive disks (RAID) comprising:
    a single Solid State Drive (SSD) provided with the multiple SMR drives in the RAID;
    said SSD only including a hot spare mode with the multiple SMR drives,
    a controller identifying a large block random write event for a SMR drive in the RAID;
    activating said SSD in said hot spare mode responsive to the identified large block random write event for the SMR drive;
    said SSD temporarily receiving new incoming writes for the identified SMR drive preempting use of the identified SMR drive;
    ending the hot spare mode for said SSD and continuing with normal writing only using SMR drives in the RAID; and
    identifying a recovery mode for the identified SMR drive responsive to ending said hot spare mode, and moving data from said SSD to the identified SMR drive.

12. The apparatus as recited in claim 11 wherein said controller identifying a recovery mode responsive to ending said hot spare mode includes said controller identifying a predefined level of controller utilization, and moving data from said SSD to the identified SMR drive to recover the identified SMR drive to a normal state.

13. The apparatus as recited in claim 11 wherein said controller identifying said large block random write event for a SMR drive in the RAID includes one of said SMR drives sending a signal to said controller responsive to defragmentation being started.

14. The apparatus as recited in claim 11 includes a counter and a large block random write hot spare scheduler for detecting said large block random write event for the identified SMR drive.

15. The apparatus as recited in claim 11 wherein said SSD temporarily receiving new incoming writes for the identified SMR drive includes writing strip-based to said SSD, preempting use of the identified SMR drive for the new incoming writes.

16. The apparatus as recited in claim 11 wherein said SSD temporarily receiving new incoming writes for the identified SMR drive includes said controller ending strip-based writing to said SSD, and continuing with normal writing only using the SMR drives in the RAID responsive to completion of the large block random write event ending the hot spare mode.

17. The apparatus as recited in claim 11 includes said controller identifying a recovery mode, and performing a fast strip-based data read from said SSD to restore the identified SMR drive.

18. A data storage system comprising:
    a plurality of shingled magnetic recording (SMR) drives in a redundant array of inexpensive disks (RAID;
    a single Solid State Drive (SSD) being provided with said plurality of SMR drives in said RAID;
    said SSD only including a hot spare mode with said plurality of SMR drives;

a controller implementing a sustained large block random write performance mechanism for said SMR drives, identifying a large block random write event for a SMR drive in the RAID; activating said SSD in said hot spare mode responsive to said identified large block random write event for the SMR drive; and said SSD temporarily receiving new incoming writes for the identified SMR drive preempting use of the identified SMR drive; and ending the hot spare mode for said SSD and continuing with normal writing only using SMR drives in the RAID; and identifying a recovery mode for the identified SMR drive responsive to ending said hot spare mode, and moving data from said SSD to the identified SMR drive.

19. The data storage system as recited in claim 18 wherein said controller identifying said large block random write event for a SMR drive in the RAID includes one of said SMR drives sending a signal to said controller responsive to defragmentation being started.

20. The data storage system as recited in claim 18 includes said controller ending strip-based writing to said SSD, and continuing with normal writing only using the SMR drives in the RAID responsive to completion of the large block random write event ending the hot spare mode.

* * * * *